Nov. 29, 1949     F. A. FULGHAM     2,489,633
GRAPEVINE CULTIVATOR
Filed April 25, 1947     2 Sheets-Sheet 1
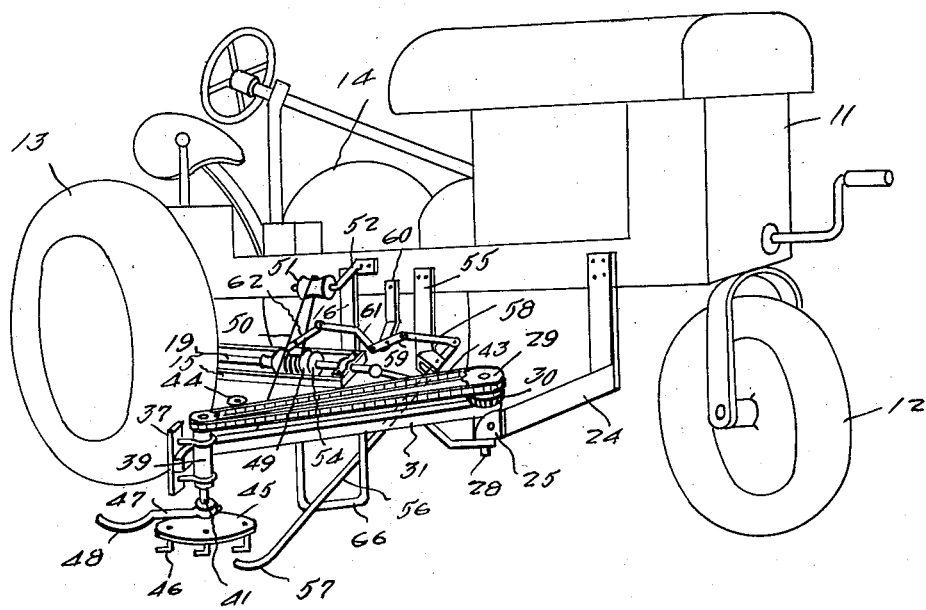
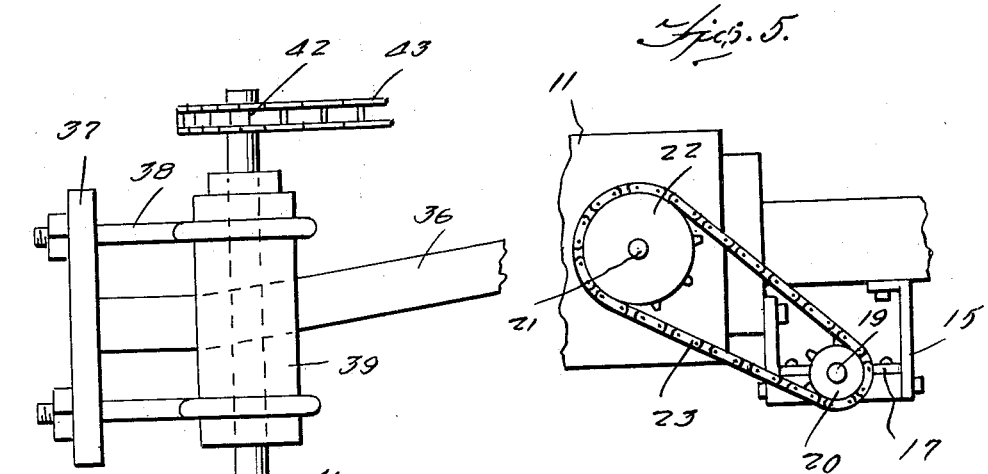
INVENTOR.
Fred A. Fulgham
BY
McMorrow, Berman + Davidson
ATTORNEYS Nov. 29, 1949     F. A. FULGHAM     2,489,633
GRAPEVINE CULTIVATOR
Filed April 25, 1947     2 Sheets-Sheet 2
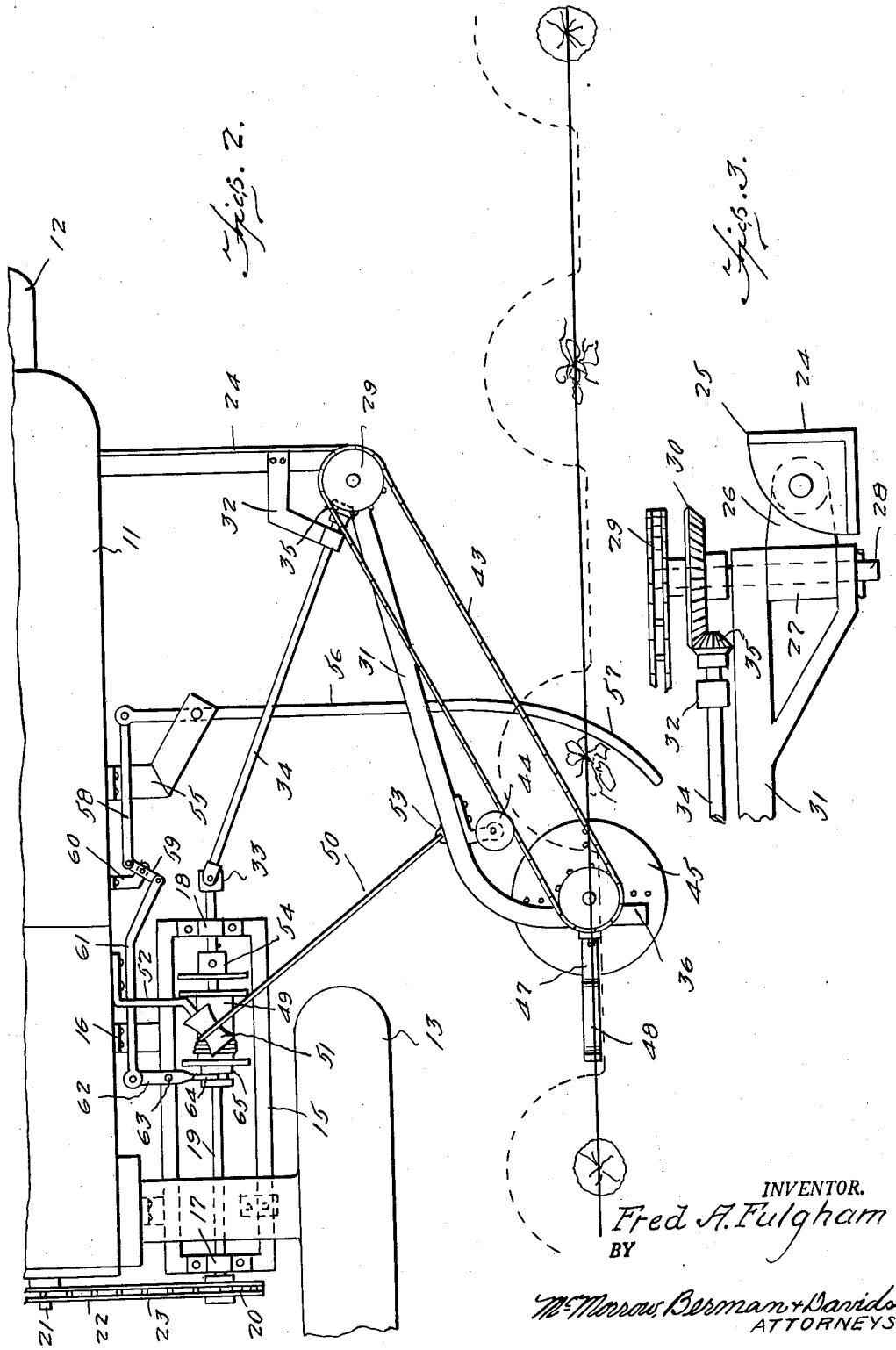
INVENTOR.
Fred A. Fulgham
BY
McMorrow, Berman & Davidson
ATTORNEYS Patented Nov. 29, 1949

2,489,633

UNITED STATES PATENT OFFICE 2,489,633

GRAPEVINE CULTIVATOR

Fred A. Fulgham, Grandview, Wash.

Application April 25, 1947, Serial No. 743,929

3 Claims. (Cl. 97—137)

This invention relates to cultivating machines, and more particularly to a cultivator for use in grape vineyards.

A main object of the invention is to provide a novel and improved cultivating machine for use in vineyards, which is very simple in construction, easy to operate and dependable in performance.

A further object of the invention is to provide an improved cultivator for vineyards and other agricultural establishments which is relatively inexpensive to manufacture, sturdy in construction, and which is provided with means for automatically retracting the cultivating portion of the device whenever a plant stem or other sizeable obstacle is encountered in the path of travel of said cultivating portion, whereby damage to the plant or to said portion is avoided.

Further objects and advantages of the invention will become apparent from the following description and claims, and from the accompanying drawings, wherein:

Figure 1 is a perspective view of a cultivating machine constructed in accordance with the present invention.

Figure 2 is an enlarged top plan detail view of the cultivating portion of the machine of Figure 1.

Figure 3 is an enlarged detail elevational view of the pivoted end portion of the cultivating arm employed in the machine of Figure 1.

Figure 4 is an enlarged detail elevational view of the free end portion of the cultivating arm employed in the machine of Figure 1, showing the rotating cultivator element carried thereby.

Figure 5 is an enlarged detail rear end view showing the power take-off means employed to furnish driving power to the cultivator portion of the machine of Figure 1.

Referring to the drawings, 11 designates a conventional tractor, which may be employed as the supporting vehicle and source of driving power for the cultivator apparatus. Tractor 11 has a front wheel 12 and a pair of rear wheels 13 and 14. Secured to the housing for the axle of rear wheel 13 is a longitudinally extending rectangular frame 15 which is also secured by a bracket 16 to the tractor body. Journaled longitudinally in frame 15 by end bearing brackets 17 and 18 is a shaft 19. Shaft 19 carries at its rear end a sprocket wheel 20. The power take-off shaft 21 of the tractor 11 carries a sprocket wheel 22 which is coupled to sprocket wheel 20 by a chain 23. Shaft 19 is therefore driven from the power take-off shaft 21 of the tractor 11.

Secured to the forward portion of the tractor body and projecting laterally therefrom is a support arm 24 which may be angular in cross-sectional shape and which is provided at its outer end with a transverse web element 25. Hinged to web 25 for pivoting in a vertical plane is a bracket member 26 formed with a vertical bearing sleeve 27. Vertically journaled in bearing sleeve 27 is a shaft 28 carrying at its top end a sprocket wheel 29 and below said wheel a bevel gear 30. Pivotally connected to shaft 28 and straddling the bearing sleeve 27 is the bifurcated end portion of a cultivator arm 31. Journaled in an angled bracket member 32 secured to arm 24 and connected to shaft 19 by a universal joint 33 is a shaft 34 which carries at its end a pinion gear 35, meshing with bevel gear 30. Shaft 28 is thereby driven by the drive shaft 19.

Arm 31 has an outwardly curved free end portion 36 to which is secured a vertical bracket 37. Bracket 37 carries a pair of eye-bolts 38, 38 and secured in the eye portions of said eye-bolts is a vertical bearing sleeve 39. Journaled in bearing sleeve 39 is the cultivator shaft 41 which carries at its top end a sprocket wheel 42 coupled by a sprocket chain 43 to sprocket wheel 29. An idler roller 44 carried by arm 31 engages the intermediate portion of chain 43 and maintains it in tension. Secured to the lower end of cultivator shaft 41 is a disc 45 carrying a plurality of depending cultivator teeth 46. Secured to the shaft 41 above disc 45 is a trailing arm 47 whose free end is downwardly curved to provide a rear trailing shoe 48 to regulate the depth of soil engagement of the cultivator teeth 46.

Slidably and rotatively mounted on shaft 19 is a flanged reel 49 on which is wound a cable 50. Cable 50 passes over a roller 51 journaled on a bracket 52 secured to the tractor body and is secured at 53 to the cultivator arm 31. Secured to shaft 19 adjacent one end flange of reel 49 is a flanged clutch collar 54. Secured to the forward body portion of tractor 11 is an angled bracket 55 and pivotally secured to the end portion of bracket 55 is a laterally extending lever member 56 having a rearwardly curved end portion 57 located ahead of the cultivator disc 45. Connected to the opposite end of lever member 56 is a link 58 which is pivotally connected to one end of an arm 59. Arm 59 is pivotally secured at its intermediate portion to a bracket 60 secured to the tractor body. The other end of arm 59 is connected by a link 61 to the end of a clutch lever 62 pivotally connected at 63 to the inner side element of frame 15. The free end of clutch lever 62 is formed with a fork 64 engaging a grooved collar 65 carried by the rear end of reel 49.

The outer free portion of lever member 56 is movably supported in a U-shaped bracket 66 depending from the cultivator arm 31.

In operation, cultivator shaft 41 is rotated by the drive shaft 19 through universal joint 33, shaft 34, pinion gear 35, bevel gear 36, shaft 28, and sprocket chain 43, rotation of the cultivator disc 45 being in a clockwise direction as viewed in Figure 2. The reaction of the soil as it is engaged by the teeth 46 swings the cultivator arm 31 outwardly to a limiting position determined by the length of cable 50 in its fully unwound position. When the curved end 57 of lever 56 encounters an obstacle, such as a vine stem in the course of forward travel of the machine, it is pivoted rearwardly by said obstacle and applies a counter-clockwise rotation to clutch lever 62, as viewed in Figure 2, through the link 58, arm 59 and link 61. The reel 49 is thereby moved into clutch engagement with flanged collar 54, which causes the reel 49 to rotate with shaft 19 and to wind cable 50 thereon. The winding of cable 50 on reel 49 retracts arm 31 inwardly so that the machine may pass the obstacle without injury thereto or to the cultivating apparatus. When the obstacle has been passed, curved portion 57 is released, allowing the reel 49 to disengage from flanged collar 54, whereby the winding tension on cable 50 is released and the cultivator arm 31 is again free to swing outwardly to its normal cultivating position.

While a specific embodiment of a cultivating apparatus for use in vineyards and similar agricultural establishments has been disclosed in the foregoing description, it will be understood that various modifications within the spirit of the invention may occur to those skilled in the art. Therefore it is intended that no limitations be placed on the invention other than as defined by the scope of the appended claims.

What is claimed:

1. A cultivator for a row of plants comprising a vehicle having a chassis and a power take-off, a frame mounted on the side of said chassis having a longitudinal shaft journalled thereon and operatively connected to said power take-off, a cable drum rotatably and slidably mounted on said shaft having a cable wound thereon, a stop collar fixed on said shaft, a shifting fork pivoted on said frame and operatively engaging said drum, said fork being movable in one direction to shift said drum along said shaft to engage said drum with said fixed collar whereby said drum is operatively connected to said shaft to wind said cable thereon, said fork being shiftable in another direction to disengage said drum from said fixed stop collar, and means for operating said shifting fork comprising a feeler arm pivoted on a portion on said side of the vehicle in front of said frame, means effectively connecting said feeler arm to said shifting fork, means connecting said cable with said arm, said feeler arm extending laterally from said vehicle chassis for engagement with the plants in the row as the vehicle is moved along beside the plant row whereby said feeler arm is swung rearwardly and laterally inwardly with respect to the vehicle by contact with the plants of the row so as to cause said shifting fork to move said drum into engagement with said fixed collar and thereby turn said drum in a direction to wind the cable thereon, a cultivator arm pivotally supported on the side of said vehicle chassis at a point forwardly of said feeler arm to which said cable is connected whereby said cultivator arm is retracted by said cable in a rearward and laterally inward direction whenever said feeler arm engages a plant of the row.

2. A cultivator for a row of plants comprising a vehicle having a chassis and a power take-off, a frame mounted on the side of said chassis having a longitudinal shaft journalled thereon and operatively connected to said power take-off, a cable drum rotatably and slidably mounted on said shaft having a cable wound thereon, a stop collar fixed on said shaft, a shifting fork pivoted on said frame and operatively engaging said drum, said fork being movable in one direction to shift said drum along said shaft to engage said drum with said fixed collar whereby said drum is operatively connected to said shaft to wind said cable thereon, said fork being shiftable in another direction to disengage said drum from said fixed stop collar, and means for operating said shifting fork comprising a feeler arm pivoted on a portion on said side of the vehicle in front of said frame, means effectively connecting said feeler arm to said shifting fork, means connecting said cable with said arm, said feeler arm extending laterally from said vehicle chassis for engagement with the plants in the row as the vehicle is moved along beside the plant row whereby said feeler arm is swung rearwardly and laterally inwardly with respect to the vehicle by contact with the plants of the row so as to cause said shifting fork to move said drum into engagement with said fixed collar and thereby turn said drum in a direction to wind the cable thereon, a cultivator arm pivotally supported on the side of said vehicle chassis at a point forwardly of said feeler arm to which said cable is connected whereby said cultivator arm is retracted by said cable in a rearward and laterally inward direction whenever said feeler arm engages a plant of the row, and ground engaging means on the outer end of said cultivator arm effective to pivot said cultivator arm forwardly and laterally outwardly from a retracted position as said feeler arm disengages from a plant of the row.

3. A cultivator for a row of plants comprising a vehicle having a chassis and a power take-off, a frame mounted on the side of said chassis having a longitudinal shaft journalled thereon and operatively connected to said power take-off, a cable drum rotatably and slidably mounted on said shaft having a cable wound thereon, a stop collar fixed on said shaft, a shifting fork pivoted on said frame and operatively engaging said drum, said fork being movable in one direction to shift said drum along said shaft to engage said drum with said fixed collar whereby said drum is operatively connected to said shaft to wind said cable thereon, said fork being shiftable in another direction to disengage said drum from said fixed stop collar, and means for operating said shifting fork comprising a feeler arm pivoted on a portion on said side of the vehicle in front of said frame, means effectively connecting said feeler arm to said shifting fork, means connecting said cable with said arm, said feeler arm extending laterally from said vehicle chassis for engagement with the plants in the row as the vehicle is moved along beside the plant row whereby said feeler arm is swung rearwardly and laterally inwardly with respect to the vehicle by contact with the plants of the row so as to cause said shifting fork to move said drum into engagement with said fixed collar and thereby turn said drum in a direction to wind the cable thereon, a cultivator arm pivotally supported on the side of said vehicle chassis at a point forwardly of said feeler arm to which said cable is connected whereby said cultivator arm is retracted by said cable in a rearward and laterally inward direction whenever said feeler arm engages a plant of the row, and ground engaging means on the outer end of said cultivator arm effective to pivot said cultivator arm forwardly and laterally outwardly from a retracted position as said feeler arm disengages from a plant of the row, said ground engaging means comprising a vertical axis cultivator rotor, and means for driving said cultivator rotor comprising a rotory element on said portion on the side of the vehicle, a first connection between said cultivator rotor and said rotory element, and a second connection between said rotory element and said shaft.

FRED A. FULGHAM.

REFERENCES CITED

The following references are of record in the file of this patent:

UNITED STATES PATENTS

| Number | Name | Date |
| --- | --- | --- |
| 518,363 | Brookens | Apr. 17, 1894 |
| 900,981 | Chilson | Oct. 13, 1908 |
| 1,591,482 | Fredendall | July 6, 1926 |
| 2,319,255 | Norton | May 18, 1943 |
| 2,402,365 | Butler | June 18, 1946 |